Figure 1:
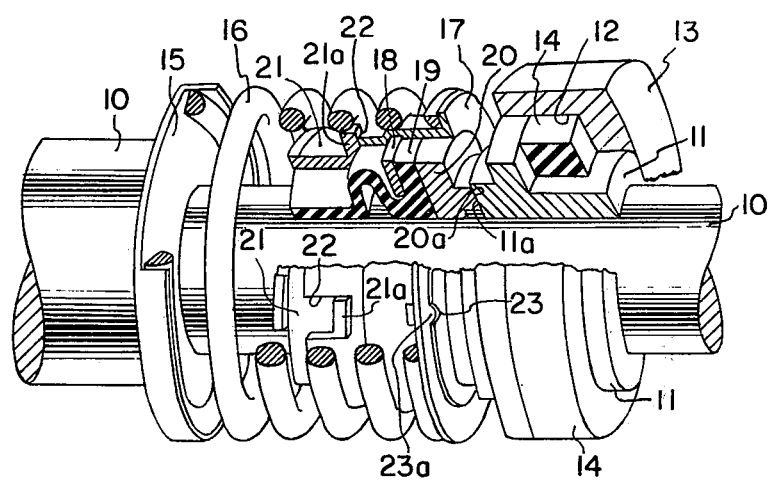

United States Patent [19]
Floyd et al.

[11] 3,969,451
[45] July 13, 1976

[54] MECHANICAL SEALS
[75] Inventors: James R. Floyd; Paul N. Dalenberg, both of Saginaw; Robert B. Slivensky, Bridgeport, all of Mich.
[73] Assignee: The Wickes Corporation, San Diego, Calif.
[22] Filed: Dec. 6, 1973
[21] Appl. No.: 422,186

Related U.S. Application Data
[63] Continuation of Ser. No. 143,789, May 17, 1971, abandoned.

[52] U.S. Cl. ................................ 264/29; 264/162; 264/236; 264/242; 277/96
[51] Int. Cl.² ......................................... F16J 15/50
[58] Field of Search ............. 264/29, 242, 162, 134, 264/236, DIG. 63; 277/93, 96 R, 96 B, 96 SD

[56] References Cited
UNITED STATES PATENTS

| 2,362,436 | 11/1944 | Stratford | 277/87 |
| 2,425,209 | 8/1947 | Snyder et al. | 277/96 B |
| 2,886,352 | 5/1959 | Krellner | 277/96 B |
| 2,982,671 | 5/1961 | Hunter | 264/29 |
| 3,093,382 | 6/1963 | Macks | 277/96 A |
| 3,218,086 | 11/1965 | Donley | 277/96 R |
| 3,588,128 | 6/1971 | Petersen | 277/93 SD |
| 3,619,430 | 11/1971 | Hiratsuka et al. | 264/29 |

FOREIGN PATENTS OR APPLICATIONS

| 1,911,537 | 7/1969 | Germany | 264/29 |

Primary Examiner—Jeffery R. Thurlow
Attorney, Agent, or Firm—Learman & McCulloch

[57] ABSTRACT

A long wearing mechanical seal assembly comprising two paired sealing members of predetermined composition wherein the contacting surfaces are in rotating relationship with respect to one another, and wherein the members cooperate to prevent fluid flow between the contacting surfaces, a first one of said members being composed of a material suitable for a seal seat (e.g., cast iron, alumina ceramic or chrome plated steel) and the second member comprising a seal composed of a graphitic matrix that is filled with particulate, non-abrasive matter (e.g. Nepheline syenite, alpha-alumina or quartz) which is harder than the matrix and which has a microhardness greater than the matrix to prevent the seal from wearing at the wear rate of the matrix.

19 Claims, 1 Drawing Figure

U.S. Patent  July 13, 1976  3,969,451

INVENTORS
JAMES R. FLOYD
PAUL N. DALENBERG
ROBERT B. SLIVENSKY
BY
Learman & McCulloch

MECHANICAL SEALS

This is a continuation of application Ser. No. 143,789, filed in the U.S. Pat. Office on May 17, 1971, now abandoned.

This invention relates to rotating mechanical seal arrangements wherein one of the cooperating sealing members is made out of a graphitic composition, such as a mixture of graphite, coke, and pitch. More particularly, the invention concerns an improvement in such mechanical seals involving the use of a hard, particulate filler material in the graphitic sealing member.

Rotating mechanical seals where one of the sealing members is made of a self-lubricating, carbon bonded, graphitic composition are used in many applications where it is desired to prevent the flow of a fluid between the sealing surfaces or interfaces, including water pumps, air conditioner compressors, etc. A persistent problem which has existed with these seals, however, is that of wear, especially in those arrangements wherein the graphitic sealing member rotates against the surface of another sealing member having a microhardness of about 200 or more. (As referred to throughout this specification, microhardness is in units of kilograms per square millimeter, as determined on a Vickers Micro-Hardness Tester.) The graphitic sealing members heretofore employed in this environment, to the best of our knowledge, have generally not exceeded about 120 in microhardness, and they wear when used in cooperation with members composed of much harder materials such as nickle incorporating (Nyresist) cast iron (microhardness of about 250), hereinafter simply referred to as cast iron, or alumina ceramic (microhardness of about 3000).

An additional drawback of the graphitic sealing members heretofore developed is their tendency to "blister" (i.e., form small pits or scales in their surfaces) when used, for instance, in cooperation with a ferrous metal sealing member to seal against the flow of hydrocarbonaceous fluids, e.g., oil-containing air conditioner compressor fluids.

One of the prime objects of the invention is to provide a graphitic seal of lubricious character which does not appreciably wear over a long service life when used in sealing engagement with a matched surface on a seat of predetermined character.

A further important object of the invention is to provide a seal of the character described which develops no appreciable blisters during its service life.

Still another object of the invention is to provide a highly reliable and efficient seal which can be economically manufactured and is sufficiently more durable to very significantly increase the life of mechanisms in which it is employed.

Other objects and advantages of the invention will be pointed out specifically or will become apparent from the following description, when it is considered in conjunction with the appended claims and the accompanying drawings, in which:

FIG. 1 is a partly sectional, perspective view illustrating a typical seal assembly for a rotating shaft such as encountered in pumps.

Referring now more particularly to FIG. 1, wherein we have illustrated only one sealing application such as, for example, encountered in a rotating water pump, the numeral 10 generally designates a rotating pump shaft which is journaled at one end by a seat member 11, received within a bore 12 provided in a pump housing wall 13. A rubber seat ring 14 mounts on the seat 11 to prevent passage of fluid from left to right in FIG. 1 to the exterior of pump housing 13 through bore 12.

Mounted on shaft 10 to rotate therewith is a spring holder 15 for a coil spring 16, which also bears against a retainer 17, the retainer 17 mounting a disc 18 which retains a synthetic rubber bellows member 19 which is forced by spring 16 to exert pressure against the graphitic seal 20. The rotating seal 20 and non-rotating seat 11 have interfaces, 20a and 11a respectively, which are precision lapped to prevent leakage of fluid in a radial direction. Typically, the lapped faces 20a and 11a will be smooth to ± 0.0002 of an inch and preferably to 3 – 6 light bands.

A driving band 21 has projections 21a received within notches 22 provided in retainer 17. Also provided on the retainer shell 17 and sealing washer 20 are interlocking notches 23 and projections 23a to insure that the shell 17 rotates the washer 20. Positive drive within the assembly is achieved by tightly compressing the driving or left end of the rubber bellows 19 against the shaft 10 via band 21, to cause the bellows 19 to rotate with the shaft. Non-slipping is insured by the projections on the metal driving band which engages slots in the retainer shell and the retainer shell in turn then drives the sealing washer 20 by means of the interlocking notches and projections mentioned. Spring pressure is transmitted to sealing washer 20 via the retainer 17, disc 18 and the outer flange of bellows 19, and constant contact is maintained at the interface 20a and 11a at all times.

It has now been discovered that much improved (in terms of wear and blister resistance) mechanical seal arrangements can be obtained when using a first sealing member (seat 12) having a hardness of at least about 200 and a second sealing member (seal 20) which is made of a graphitic composition, if the second member is composeed of a graphitic matrix that is filled with particulate matter which is harder than the matrix and which has a microhardness in the range from about 0.25 – 15 times the microhardness of the seat less than the microhardness of the first member (seat) to about 2½ –15 times more than the microhardness of the first member dependent on the fluid being sealed and the hardness of the seat. Where the fluid being sealed against is water, it is preferred that the least difference reasonably possible exist between the hardness of the first sealing member and the hardness of the filler material in the second member, e.g., that the filler have a microhardness in the range from about 0.25 – 15 times the microhardness of the first member less than the first member to about 250% of the microhardness of the first member more than the first member. Where the fluid is hydrocarbonaceous, the matter may be up to about fifteen times as hard.

The particulate filler matter for the graphitic sealing member of the present invention preferably has a particle size of about 100 microns to 1/10th of a micron, most preferably about 3 to 10 microns. It is also preferred that the filler particles be smooth surfaced and curvilinear. Such particles may be characterized as non-abrasive particles by reason of their shape and/or size. For this reason, calcined alpha-alumina, for example, a smooth surfaced, curvilinear material, is preferred to fused alpha-alumina, which is characterized by sharp edges and corners. Examples of suitable filler materials include calcined alpha-alumina, nepheline syenite, quartz, and tungsten carbide. The amount of filler employed is about 0.025 to 45%, preferably about 2½ to 12½%, of the volume of the matrix and most preferably less than 10% by weight.

The graphitic matrix, which typically will have a hardness of 100 – 120 or less, can be any of those which are conventionally employed in mechanical carbon seals. It may typically be comprised of about 10 to 70, preferably about 15 to 50 weight percent graphite; about 4 to 70, preferably about 15 to 50 weight percent coke; and about 15 to 70, preferably about 25 to 50 weight percent of binder material. Alternatively, it may include little or no coke and may include lamp black. In practice it need include only sufficient graphite for lubricity and sufficient binder to bond the particles. The preferred coke, which functions as a filler, is petroleum coke. Suitable binder materials include coal tar pitch and resins such as Clorafin 40 (Hercules Powder Co.). The graphite can be amorphous natural graphite or a synthetic graphite such as Acheson graphite.

Fabrication of the graphitic sealing members, such as sealing rings 20, from the composition of the present invention can be by known methods. Thus, for example, a homogeneous blend is preferably prepared of the particulate graphitic matrix and the particulate filler material, the blend is compressed into shape, and the compressed mixture is then heated, for example to 2100°F. The heating process usually renders the surface of the shaped composition, or blank, somewhat porous. It is preferred, then, to reduce this porosity by impregnating the blank with a thermosetting resin and then curing the resin, or with a suitable metallic composition such as babbitt metal or antimony.

The slow and gradual heating (i.e. above 15 hours) of the compressed graphitic composition should be in an inert atmosphere and should not exceed about 2100°F. Higher temperatures, for example in the graphitizing range, can result in the loss of fillers such as alpha alumina which vaporize at these temperatures.

The filler material used in the sealing members of the present invention can also, if desired, be formed in situ in the graphitic matrix. Thus, for example, formation of a graphitic blank can be with the inclusion of particulated tungsten as a filler, and then the heating of the blank will cause carbonization and formation of particles of tungsten carbide.

The mechanical seal arrangements of the present invention will usually include a stationary member cooperating with and bearing against a rotating member. These include arrangements such as shaft seals found in the aforementioned water pumps and air-conditioning compressors, as well as tip seals used in pumps and turbines, etc. The present invention is particularly useful in those mechanical seal arrangements illustrated in FIG. 1 wherein the graphitic seal member rotates against a stationary, non-graphitic sealing seat member.

The invention will be better understood by reference to the following examples, which are presented for illustration purposes only. The sealing ring in each example may be prepared from a composition about 70% by weight of an amorphous natural graphite-calcined petroleum coke mix and 30% by weight of coal tar pitch. The mix may comprise 50% graphite and 50% petroleum coke.

The coal tar pitch preferred and used is a high melting range pitch obtained from Barrett Division of Allied Chemical and Die Corporation and the natural graphite preferred and used is the Mexican type designated No. 205 by the supplier, United States Graphite Division of The Wickes Corporation. Typically, graphite will be used in particles of 1/10th micron to 20 microns in size and the pitch may be of the same size or utilized in larger or smaller particles, as desired. When the more volatile hydrocarbons have been removed from the pitch during the initial blending of the pitch and graphite at an elevated temperature which liquefies the pitch, the resulting product which solidifies upon cooling may be finely pulverized to 200 mesh or to the size of the filler particles, prior to being mixed with the harder filler particles. After forming the resulting mixture to seal shape and heating and cooling it in the manner indicated, the resins which are forced into the voids in the product after it is removed from the oven may be suitable phenolformaldehyde resins such as Monsanto No. 410 water soluble phenolic resin, or any epoxy resin, or shellac. The composition of the seat is disclosed in the examples. In each example the seal members are evaluated for wear by running the parts for 100 hours with the sealing ring and seat in place and sealing against the flow of the indicated fluid. Then both the ring and the seat are scrutinized with a high power microscope and the extent of blistering is determined.

The microhardness values reported in the examples are determined with a Vickers Micro-Hardness Tester, manufactured by Bergman Micro-Hardness Tester Company of Sweden, and are in the units mentioned.

EXAMPLE 1

The sealing ring is composed of a mixture of about 30 weight percent pitch, 9 weight percent 5 micron size, calcined alpha-alumina (microhardness - 3000), and a balance consisting of amorphous natural graphite and calcined petroleum coke. The particulate pitch and graphite materials are homogeneously blended while being heated in a double sigma mixer to a temperature of about 270°C (the wetting or liquefying temperature of the pitch) and the mix then is cooled, particulated and blended with the alumina particles. The blend is then pressed into a blank under about 10 tons per square inch of pressure. The blank is thereafter slowly baked in an inert atmosphere over a period of over 15 hours to a temperature of about 2100°F which causes dehydrogenation of the pitch to the extent that a nongraphitic free carbon bond is created to unite the other ingredients. The baked blank is then machined (including lapping) to the desired sealing ring shape and is then rendered less porous by forcing a phenolic resin into its pores and then curing the resin by heating it to a curing temperature of about 300°F.

The sealing ring of this example was tested in combination with an alpha-alumina ceramic seat (containing about 80 weight percent of alumina (microhardness - 3000) and a balance consisting of secondary phases (primarily glass). The fluid employed was water. After 100 hours of operation the seat showed no measurable wear rate, whereas the sealing ring had been worn down about 0.2 mils. This extent of sealing ring wear compares extremely favorably to a control which was composed of the same graphitic matrix, but without any filler. The control, after 100 hours of operation, had been worn down about 9 mils, which is about 45 times more wear than experienced with the sealing ring of this invention.

EXAMPLE 2

The same compositions and method were used as employed in Example 1, except that 73 micron size calcined alpha-alumina was used in place of the five micron alpha-alumina. The resultant sealing ring showed about the same degree of wear resistance as the seal containing the five micron material, and the alpha-alumina ceramic seat showed no measurable wear.

EXAMPLE 3

The same compositions and method as employed in Example 1, except that 0.1 micron size calcined alpha-alumina is used in place of the 5 micron alpha-alumina. The resultant sealing ring shows about the same degree of wear resistance as the ring containing the 5 micron material, and the alpha-alumina ceramic seat shows no measurable wear.

EXAMPLE 4

The same compositions and method were used as employed in Example 1, except that 10 micron size calcined alpha-alumina was used in place of the 5 micron alpha-alumina. The resultant sealing ring showed about the same degree of wear resistance as the ring containing the 5 micron material, and the alpha-alumina ceramic seat showed to measurable wear.

EXAMPLE 5

The same compositions and method were used as employed in Example 1, except that about 0.05 weight percent of the calcined alpha-alumina is used instead of 9 weight percent thereof. The wear resistance of the resultant sealing ring was similarly good. The wear resistance of the ceramic seat was negligible.

EXAMPLE 6

The same compositions and method were used as employed in Example 1, except that about 90 weight percent of the calcined alpha-alumina particles are to be added instead of 9 weight percent thereof. The resultant sealing ring exhibited similarly good wear resistance and the alpha-alumina ceramic seat showed no measurable wear.

EXAMPLE 7

The same compositions and method were used as employed in Example 1, except that 3.6 micron size nepheline syenite particles (microhardness - 310) were used instead of alpha-alumina particles. The resultant sealing ring gave about 10 times better wear resistance then the control gave. The alpha-alumina ceramic seat showed negligible wear.

EXAMPLE 8

The same compositions and method were used as employed in Example 1, except 9 weight percent of 4 micron silicon carbide particles (microhardness 4500) were added in place of the alpha-alumina particles. The resultant sealing ring shows similarly good wear resistance and the alpha-alumina ceramic seat shows negligible.

EXAMPLE 9

The same compositions and method as employed in Example 1, except that lampblack is substituted for the petroleum coke and 10 weight percent of the five micron size alpha-alumina is used. the resultant sealing ring shows similarly good wear resistance as in Example 1, and the alpha-alumina ceramic seat has no appreciable wear.

EXAMPLE 10

The same compositions and method were employed as in Example 1, except that the sealing ring was formed from a mixture consisting of 27 weight percent of clorafin 40 resin in place of the coal tar pitch, and 12.7 weight percent of the 5 micron size alpha-alumina. Also, formation of the sealing ring differed slightly in that the foregoing materials were homogeneously blended and formed into a blank at 20 tons per square inch pressure. The blank was then cured by being heated slowly to 350°F., and its porosity was reduced by then forcing phenolic resin into the pores and curing it there. After 100 hours operation the seat showed negligible wear and the sealing ring had been worn down about 0.5 mils. This extent of sealing ring wear compares favorably to a control which was composed of the same graphitic matrix, but without any filler. The control, after 100 hours of operation, had been worn down about 10 mils, which is about 20 times more wear than experienced with the sealing ring of this example.

EXAMPLE 11

The same compositions and method were used as employed in Example 1, except that the sealing ring blank was rendered impervious by forcing babbitt metal into the pores instead of using the resin sealant. After 100 hours operation the seat showed no measurable wear and the sealing ring had been worn down about 0.2 mils. This extent of sealing ring wear compares favorably to a control which was composed of the same babbittimpregnated graphitic composition, but without any filler. The control, after 100 hours of operation, had been worn down about 2 mils, which is about 10 times more wear than experienced with the sealing ring of this example.

EXAMPLE 12

The same comparison was employed as in Example 11, except that the sealing ring blanks were impregnated with antimony instead of babbitt metal. The resulting alumina-filled sealing ring gave 8 times wear resistance than its control, and the alpha-alumina seat showed no measurable wear.

EXAMPLE 13

The same compositions and method were used as employed in Example 1, except that a nickle incorporating cast iron seat (microhardness - 250) was used instead of the ceramic seat. The alumina-containing sealing ring showed a wear resistance similar to the ring in Example 1, but the cast iron seat showed a wear of about 3 mils. This test was conducted for comparative purposes and is not an example of the invention.

EXAMPLE 14

The same procedures were used as employed in Example 1, except that approximately 10 micron size nepheline syenite particles (microhardness - 310) were used instead of the alumina filler. Also, a cast iron seat (microhardness - 250) was used instead of the ceramic seat. The sealing ring showed about 45 times less wear than a fillerless control ring. The cast iron seat showed no measurable wear.

EXAMPLE 15

The same compositions and method were used as employed in Example 1, except that a chrome plated steel seat (surface microhardness - 950) was used instead of the ceramic seat. The alumina-containing sealing ring showed good wear resistance, but the chrome plated seat wore 2 mils. The test was conducted for comparative purposes and not as an example of the invention.

EXAMPLE 16

The same compositions and method were used as employed in Example 15, except that 8 micron size quartz (microhardness - 800) was used in the sealing ring formulation instead of alpha-alumina. The resultant ring gave excellent wear resistance, and the chrome plated seat showed no appreciable wear.

EXAMPLE 17

The same compositions and method were used as employed in Example 1, except that tungsten powder, rather than alumina, was dispersed in the graphitic matrix. The subsequent baking results in in situ formation of tungsten carbide particles (microhardness - 1600), and the resultant sealing ring exhibited about 30 times less wear than the unfilled control.

EXAMPLE 18

The same compositions and method were used as employed in Example 1, except that a cast iron seat was used instead of the ceramic seat, and air-conditioning fluid (consisting of a mixture of Freon and mineral oil of lubricating viscosity) was used in the test instead of water. The sealing ring exhibited about 4 times less wear than an unfilled control. The cast iron seat showed no measurable wear.

EXAMPLE 19

The same compositions and method were used as employed in Example 1, except that a cast iron seat was used instead of the ceramic seat, and No. 2 fuel oil was used in the test instead of water. The seal exhibited about 3 times less wear than an unfilled control, and the cast iron seat showed no measurable wear.

EXAMPLE 20

The same compositions and method were used as employed in Example 18, except that 3.6 micron size nepheline syenite particles were used in place of the alpha-alumina particles in the sealing ring composition. The resultant sealing ring has similarly good wear resistance as the ring containing the alpha-alumina particles, and the cast iron seat showed no measurable wear.

EXAMPLE 21

The same compositions and method were used as employed in Example 18, except that 10 micron size copper particles (microhardness -80) were used in place of the alpha-alumina in the sealing ring composition. The resultant sealing ring had little improvement in wear resistance over an unfilled control and this test is not an example of the invention, but was run for comparative purposes.

EXAMPLE 22

The same compositions and method were used as in Example 1, except that the test was run for 3 hours, cycling, (at - 50°F) and concerned the evaluation of blister resistance while sealing against the flow of Amogear Compound No. 6 Oil (American Oil Co.) rather than water. Only one pit (blister) was detected on the alumina-filled sealing ring of this invention, whereas 14 pits were detected on an unfilled control subjected to the same test.

EXAMPLE 23

The same compositions and method were used as employed in Example 22, except that 3.6 micron size nepheline syenite particles replaced the alpha-alumina in the composition of the sealing ring. Similarly, good blister resistance was noted for the ring of this invention.

EXAMPLE 24

The same compositions and method were used as employed in Example 22, except that 8 micron size quartz particles (microhardness - 800) replaced the alpha-alumina particles in the sealing ring. Similarly, good blister resistance was noted for the ring of this invention.

EXAMPLE 25

The same compositions and method were used as employed in Example 22, except that about 10 micron size copper particles were used in place of the alumina filler in the sealing ring. The resultant sealing ring showed poor blister resistance. This test is not an example of the invention and was run for comparative purposes.

EXAMPLE 26

The same compositions and method were used as employed in Example 22, except that Master Right Angle Gear Lubricant (Reliance Electric Co.) was used in place of the Amogear Compound. Similarly, good blister resistance was noted for the sealing ring containing the alpha-alumina particles, and an unfilled control showed a much greater amount of blisters than the ring of this invention.

Summarizing, there can be a wider disparity in matching the hardness of the filler and seat when a hydrocarbonaceous fluid is being sealed and wets the interfaces. For the ranges mentioned herein, it is considered that a "match" has been made. However, the incorporation of any non-abrasive particle which prevents the graphitic matrix from wearing at its normal wear rate, and minimizes wear and blistering of the seal, and wear of the seat, will provide a considerably improved product. Generally speaking, the closer the filler particles are matched to the hardness of the seat, the better results will be.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. In a method of preparing a mechanical seal and seat assembly of the class wherein a relatively movable seal and seat therefor have confronting sealing interfaces to seal off a fluid which wets the interface and wherein the seal comprises a graphitic matrix bonded by a binder; the steps of: homogeneously dispersing non-abrasive particles in a particulate matrix mix comprising hydrocarbon binder and graphite, compressing the mix and particles into seal form, and baking the seal to substantially dehydrogenize the binder to create a non-graphitic free carbon bond for the graphite and particles, to form a seal having said particles in said seal interface; and matching the seal interface with a seat interface, the seat interface having a microhardness of at least about 200 kilograms per square millimeter; and the particles, being of a size and shape to be non-abrasively smooth to the seat interface and having a microhardness in the range of at least about 200 kilograms per square millimeter.

2. The method of claim 1 wherein said particles have curvilinear surfaces which prevent them from abrading.

3. The method of claim 1 wherein said particles are so small in size that they do not abrade.

4. The method of claim 1 wherein said particles are less than 10 percent by weight of the mix and particles.

5. The method of claim 1 wherein said seat is an alumina ceramic and said particles comprise calcined alpha-alumina.

6. The method of claim 1 wherein the seat is an alumina ceramic and the particles comprise nepheline syenite, the fluid being of hydrocarbonaceous character.

7. The method of claim 1 wherein the seat is a cast iron, the particles comprise calcined alpha-alumina and the fluid incorporates oil.

8. The method of claim 1 wherein the seat is a cast iron and the particles comprise nepheline syenite.

9. The method of claim 1 wherein the particles are about 0.025 to 45 percent of the volume of the matrix.

10. The method of claim 1 wherein the particles have a particle size in the range of about 0.1 to 100 microns.

11. The method of claim 1 wherein the particles have a microhardness of about 200 to 4500 kilograms per square millimeter.

12. The method of claim 1 wherein the seat is composed of alpha-alumina ceramic and the particles are selected from the group consisting of alpha-alumina and tungsten carbide.

13. The method of claim 1 wherein the particles are selected from the group consisting of alpha-alumina, tungsten carbide, silicon-carbide, diamond dust, quartz, and nepheline syenite.

14. The method of claim 1 wherein the seal interface is machined to desired shape after the baking step, and then rendered less porous by forcing resin into its pores and curing the resin.

15. The method of claim 1 wherein the seal is machined to desired shape, and then rendered less porous by forcing a resin into its pores curing the resin.

16. The method of claim 1 wherein the non-abrasive particles are generally in the range of 1/10th of a micron to 100 microns in size, and the seal is baked at temperatures up to about 2100°F.

17. In a method of preparing a mechanical seal and seat assembly of the class wherein a relatively movable seal and seat therefor have confronting sealing interfaces to seal off a fluid which wets the interface and wherein the seal comprises a graphitic matrix bonded by a binder; the steps of homogeneously dispersing carbide forming particles in a particulate matrix mix comprising hydrocarbon binder and graphite, compressing the mix and particles into seal form, and baking the seal to substantially dehydrogenize the binder to create a non-graphitic free carbon bond for the graphite and to form dispersed carbide particles in situ in said matrix at said seal interface; and matching the seal interface with a seat interface, the seat interface having a microhardness of at least about 200 kilograms per square millimeter; and the particles being of a size and shape to be non-abrasively smooth to the seat interface and having a microhardness in the range of at least about 200 kilograms per square millimeter.

18. The method of claim 17 wherein the particles have a microhardness of about 200 to 4500 kilograms per square millimeter.

19. The method of claim 17 wherein the carbide forming particles comprise tungsten powder.

* * * * *

UNITED STATES PATENT AND TRADEMARK OFFICE
CERTIFICATE OF CORRECTION

PATENT NO. : 3,969,451
DATED : July 13, 1976
INVENTOR(S) : James R. Floyd et al

It is certified that error appears in the above-identified patent and that said Letters Patent are hereby corrected as shown below:

Column 1, line 48, add quotation marks around "blisters".

Column 5, line 27, change "to" to -no--.

Column 5, line 68, change "the" to --The--.

Column 6, line 46, change "resulting" to --resultant--.

Column 6, line 46, after "times" add --better--.

Signed and Sealed this

Twenty-first Day of September 1976

[SEAL]

Attest:

RUTH C. MASON
*Attesting Officer*

C. MARSHALL DANN
*Commissioner of Patents and Trademarks*